Figure 1:
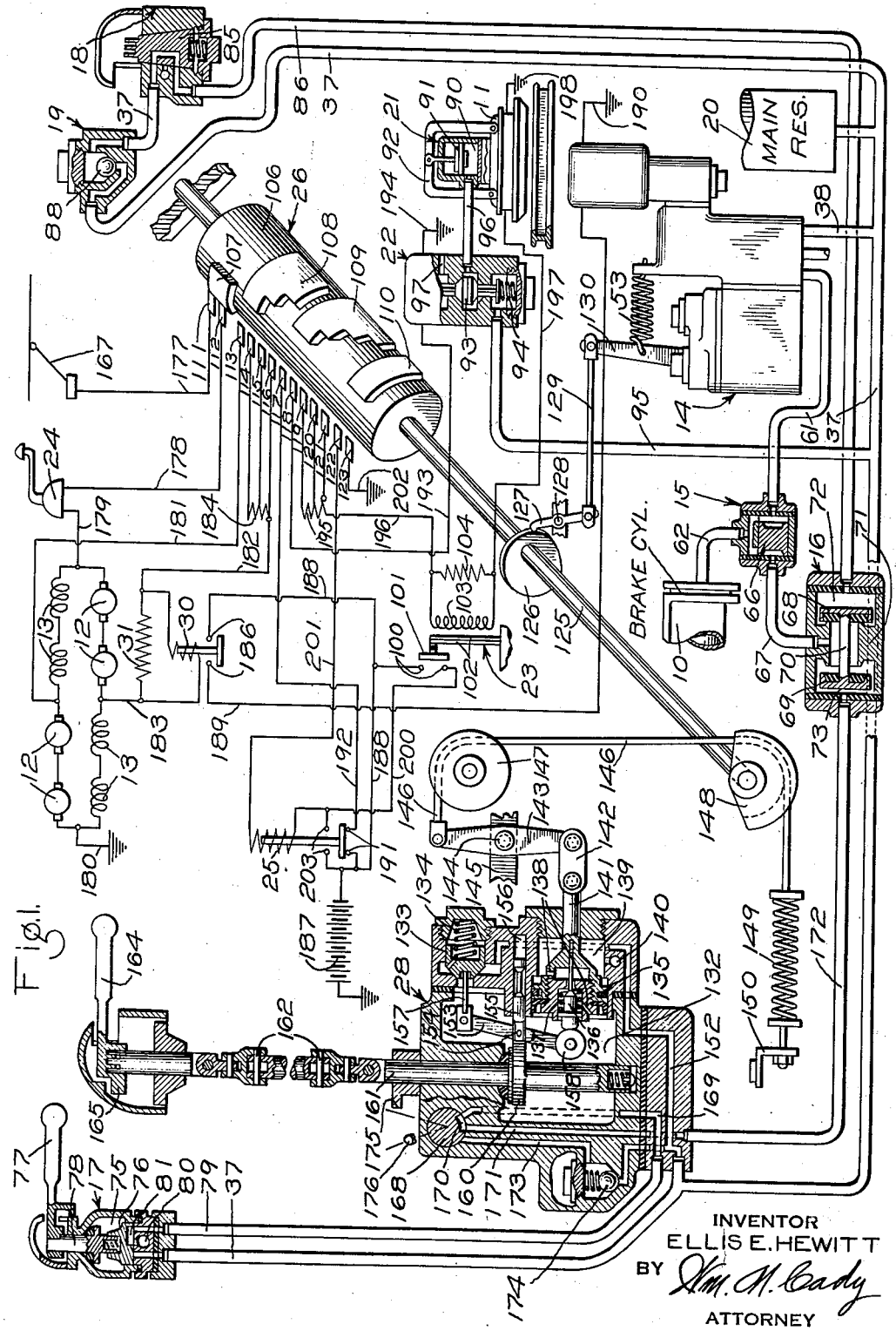

Sept. 17, 1940.  E. E. HEWITT  2,215,354
BRAKE EQUIPMENT
Filed Feb. 1, 1936  2 Sheets—Sheet 1

INVENTOR
ELLIS E. HEWITT
BY *Wm. H. Cady*
ATTORNEY

Sept. 17, 1940.  E. E. HEWITT  2,215,354
BRAKE EQUIPMENT
Filed Feb. 1, 1936   2 Sheets-Sheet 2
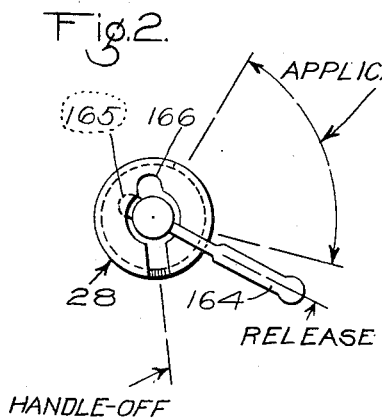
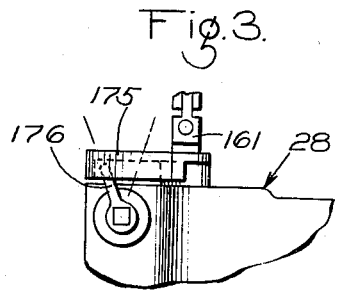
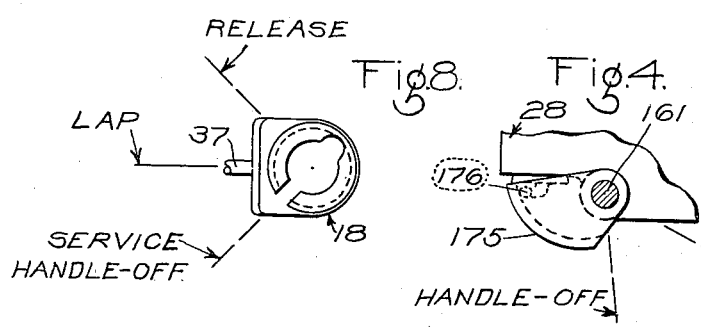
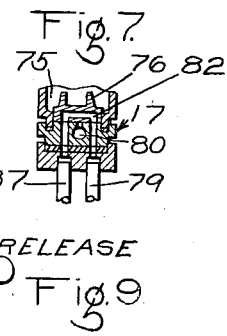
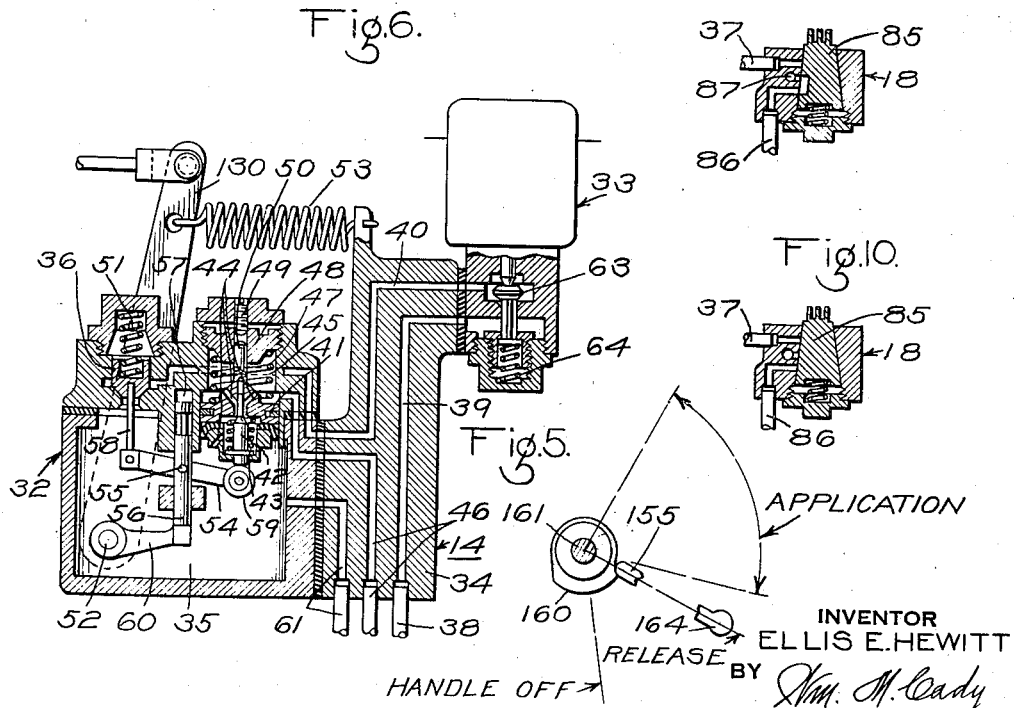
INVENTOR
ELLIS E. HEWITT
BY Wm. M. Cady
ATTORNEY Patented Sept. 17, 1940

2,215,354

UNITED STATES PATENT OFFICE 2,215,354

BRAKE EQUIPMENT

Ellis E. Hewitt, Edgewood, Pa., assignor to The Westinghouse Air Brake Company, Wilmerding, Pa., a corporation of Pennsylvania Application February 1, 1936, Serial No. 61,964

34 Claims. (Cl. 303—3)

This invention relates to brake equipments, and more particularly to brake equipments for high speed trains and traction vehicles.

Brake equipments have heretofore been proposed for high speed trains and traction vehicles in which three types of brakes have been employed, namely, a fluid pressure brake, a magnetic track brake, and a dynamic brake. The dynamic brakes comprise the vehicle driving motors and suitable control mechanism for connecting the motors in a dynamic braking circuit when it is desired to decelerate the train or vehicle.

In these proposed equipments the magnetic track brakes and dynamic brakes only are applied when making normal stops, with the fluid pressure brakes being cut into action near the end of the stop, at which time the effectiveness of the dynamic brakes decreases. When the train thus comes to rest, the magnetic track brakes and the fluid pressure brakes will be applied while the dynamic brakes will be wholly ineffective.

If the magnetic track brake windings should remain energized for very long after the train or vehicle comes to rest, there is danger of burning out these windings due to overheating. The magnetic track brake windings should therefore be deenergized at the time the vehicle or train comes to rest, or shortly thereafter.

Since the reason the magnetic track brakes are to be cut out at the end of the stop is due to the danger of overheating and burning out of the windings of these brakes, it is preferable that the means which is employed to cut the brakes out of action be responsive to the temperature of these windings, or a temperature proportional thereto.

It is a general object of the present invention to provide a brake equipment employing fluid pressure brakes, magnetic track brakes, and dynamic brakes, in which the dynamic and track brakes are employed to make normal stops, with the fluid pressure brakes automatically cut into action at or near the end of the stop, at which time the dynamic brakes decrease in effectiveness, and the magnetic track brakes cut out of action when the temperature of their windings reaches a predetermined value below the danger point.

Where such a plurality of brakes are employed it is desirable that the control thereof be embodied in a common mechanism which may be manually controlled with great facility. If such a common control were to be directly coupled to and operated by a control handle, such as that commonly employed in fluid pressure brake systems alone, the manual effort required would be so great as to render the control inflexible. Another object of the present invention is to provide a manual control which requires only a light manual force to operate, thereby providing a high degree of flexibility.

A yet further object of the invention is to provide a brake equipment employing the three types of brakes hereinbefore referred to, in which thermal means are employed to cut the magnetic track brakes out of action when a predetermined temperature, corresponding to that produced in the track brake windings, is attained.

A still further object of the invention is to provide a brake equipment of the type hereinbefore referred to in which applications of at least one of the brakes employed may be effected from the rear end of the vehicle or train when backing up.

Further objects and advantages of the invention will be more apparent from the following description, which is taken in connection with the attached drawings, wherein, Fig. 1 is a diagrammatic and schematic view of one embodiment of the invention adapted for a single vehicle, Fig. 2 shows the various positions for the handle in the main brake controller shown in Fig. 1, Figs. 3, 4 and 5 show in fragmentary form details of portions of the main brake controller shown in Fig. 1, Fig. 6 is a diagrammatic view of the brake valve device for the fluid pressure brakes shown to the lower right in Fig. 1, Fig. 7 shows in diagrammatic form the communications established in the derail throwing brake valve, shown to the upper left in Fig. 1, when this brake valve is in application position, Figs. 8, 9 and 10 are detail views of the backing up brake valve shown to the upper right in Fig. 1.

Considering now briefly at first the embodiment shown in Fig. 1, the fluid pressure brakes are represented by the brake cylinder 10, the magnetic track brakes by the magnetic track brake device 11, and the dynamic brakes by the vehicle driving motors which have armatures 12 and field windings 13.

The fluid pressure brake system may comprise a control valve device 14, two double check valve devices 15 and 16, a derail throwing brake valve device 17, a backing up brake valve device 18, a check valve device 19, and a main reservoir 20.

The magnetic track brake system may comprise a raising cylinder 21, a magnet valve device 22, a thermal relay 23, and an electrical relay 25.

The dynamic brake system may comprise the vehicle motors heretofore referred to, and a power controller 24, which is employed to supply current to the driving motors when driving the vehicle. Both the dynamic brakes and magnetic track brakes may be controlled from a common controller device indicated at 26.

A master control mechanism, for controlling applications of all of the various brake systems above referred to, is shown at 28.

In order that the fluid pressure brakes shall be suppressed when the dynamic brakes are effective, there is provided a relay 30 connected to a resistance device 31.

Considering now more in detail the apparatus above referred to, the control valve device 14 comprises a self-lapping portion 32, a suppression magnet valve portion 33, and a pipe bracket 34.

The self-lapping portion 32 comprises a casing defining a chamber 35, and having a supply valve 36 adapted when unseated to supply fluid under pressure from the main reservoir 20 to the chamber 35, by way of main reservoir pipe 37, branch pipe 38, passage 39, the magnet valve portion 33, and passage 40.

The self-lapping portion is also provided with a movable abutment 41 in the form of a piston containing interiorly thereof a release valve 42 urged toward an unseated position by a spring 43. When the release valve 42 is unseated, a communication is established between the chamber 35 and the atmosphere, comprising passages 44, a chamber 45, and pipe and passage 46.

The movable abutment 41 is subject on its lower side to pressure of fluid in chamber 35 and on its upper side to pressure of a regulating spring 47. Tension on the regulating spring may be regulated by an adjusting member 48. The degree of movement of the movable abutment 41 upward may be varied by a set screw 49, which is adapted to engage a stem 50 associated with the movable abutment.

For seating the release valve 42 and for unseating the supply valve 36 against opposition of its spring 51, there is provided a mechanism comprising a lever 54 pivotally mounted intermediate its ends at 55 to a plunger 56. The plunger 56 is slidably disposed in a bore 57 and is movable back and forth in this bore.

The left end of the lever 54 carries a stem 58 which is disposed in a recess in the supply valve 36. The right end of the lever 54 carries a roller 59 which is adapted to engage the stem of the release valve 42.

When the plunger 56 is actuated upwardly, the lever 54 fulcrums about its left end to first seat the release valve 42 against opposition of its spring 43, and then fulcrums about its right end to unseat the supply valve 36 against opposition of its spring 51. It is to be here understood that the release valve spring 43 is lighter than the supply valve spring 51, whereas both springs 43 and 51 are much lighter than the regulating spring 47, so that during the aforedescribed movement of the plunger 56, the regulating spring 47 is unappreciably compressed.

When the release valve 42 is seated and the supply valve 36 is unseated, fluid under pressure will flow to chamber 35. As the pressure in this chamber increases, it acts upon the movable abutment 41 to urge it upwardly against opposition of the regulating spring 47. This movement of the movable abutment 41 permits the lever 54 to rotate about its fulcrum 55 under action of the supply valve spring 51, the limit of rotation being reached when the supply valve 36 is seated. When the supply valve 36 is seated, the supply of fluid under pressure to the chamber 35 will be lapped.

Now the parts are so designed that the pressure at which the lap takes place is dependent upon the degree of movement of the plunger 56 upwardly.

If the pressure should exceed this value, then the movable abutment 41 will continue to move upwardly until the release valve 42 is unseated, whereupon fluid under pressure will be released from chamber 35, through the communication aforedescribed, until the pressure drops to the desired value.

The chamber 35 is in communication with the brake cylinder 10 by way of pipe and passage 61, the double check valve device 15, and pipe 62, so that variations of the pressure in chamber 35 determine the degree of brake cylinder pressure, and hence the degree of application of the fluid pressure brakes.

The plunger 56 is actuated upwardly by an arm 60 secured to a shaft 52 which is rotated by a lever 130. The lever 130 is biased to a release position by a spring 53, as shown.

The magnet valve portion 33 is embodied in a casing provided with a valve 63, which is urged toward an unseated position by a spring 64 and toward a seated position by action of an electromagnet (not shown) in the upper part of the casing which, when energized, actuates the valve 63 downwardly. As will be observed, the valve 63 controls the communication from the main reservoir 20 to the seat of the supply valve 36, and so long as this valve is unseated this communication is open, and is closed when this valve is seated.

The double check valve device 15 is embodied in a casing comprising a slide valve 66, which moves to the left or right depending upon whether the pressure of the fluid supplied from pipe 61 or that from pipe 67 is the greater.

The check valve device 16 is also embodied in a casing and is provided with two valves 68 and 69 connected by a stem 70 and disposed, respectively, in chambers 72 and 73. The stem 70 is slidable in a fluted center wall 71.

When the pressure of fluid supplied to chamber 72 exceeds the pressure of fluid supplied to chamber 73, the valve 68 will seat while valve 69 will be unseated. When the pressure supplied to chamber 73 exceeds that supplied to chamber 72, the valve 69 will seat while the valve 68 will unseat. It will thus be seen that with one or the other of the two valves seated, fluid under pressure may flow past the unseated valve through pipe 67, double check valve 15, and pipe 62 to the brake cylinder 10.

The derail throwing brake valve device 17 is embodied in a casing having a chamber 75 in which is disposed a rotary valve 76 rotatable by a handle 77 secured to a shaft 78 engaging with the rotary valve. The rotary valve 76 is adapted to establish communication between a pipe 79 and an exhaust port 80 by way of cavity 81, when the handle 77 is in release position. When the handle 77 is in application position, this communication is cut off and a communication is established between main reservoir pipe 37 and the pipe 79, by a port 82 in the rotary valve 76, as is shown in Fig. 7.

The backing up valve device 18 is embodied in a casing having a rotary valve 85 adapted in application position to establish a communication between the main reservoir pipe 37, by way of check valve device 19, and a second pipe 86 leading to the double check valve device 16. This valve device also has a lap position, in which this communication is closed, as is shown in Fig. 10. In its release position, the valve device connects the pipe 86 to atmosphere by way of exhaust port 87, as shown in Fig. 9.

The check valve device 18 is a simple check valve device having a ball valve 88 which permits flow of fluid under pressure from the main reservoir 20 to the backing up valve device 18, but prevents flow in the opposite direction.

The magnetic track brake device 11 may be any of the types commonly employed for track braking purposes. This brake device may be held suspended in its inoperative position above a track rail by the raising cylinder 21, which is embodied in a casing having a chamber 90 in which is disposed a piston 91 connected to a yoke 92 attached to the brake device 11. When fluid under pressure is supplied to the chamber 90, the brake device 11 will be held in its inoperative position, and when fluid under pressure is released from this chamber the brake device will drop by gravity to engagement with the rail.

The magnet valve device 22 is provided for controlling the supply of fluid under pressure to and its release from the chamber 90. This magnet valve device may comprise a double beat valve 93 urged toward an upper seated position by a spring 94, and toward a lower seated position by action of an electromagnet in the upper part of the valve device casing, which when energized actuates the double beat valve 93 downwardly.

When the double beat valve 93 is in the upper seated position fluid under pressure is supplied from the main reservoir 20, by way of pipes 37 and 95, past the unseated double beat valve 93, and through pipe 96 to chamber 90. When the double beat valve 93 is in lower seated position, this communication is cut off and fluid under pressure is released from the chamber 90 to the atmosphere past the open upper seat of the double beat valve, and through exhaust port 97.

The thermal relay 23 may be of any of the types which respond to a predetermined temperature to close contacts 100, as by a bridging contact member 101. For the purpose of illustration, I have shown a relay of the bimetallic type, comprising two thermal elements 102 exposed to the temperature of a heating coil 103 connected across a resistance 104 in circuit with the track brake device 11.

When the temperature of the coil 103 is below a predetermined value the thermal elements 102 will position the bridging contact 101 as shown, but as the temperature of coil 103 approaches the predetermined or critical value, bridging contact 101 will be actuated toward and at the critical temperature into engagement with the stationary contacts 100. It is to be here understood that the heating coil 103 is designed to have a temperature rise characteristic corresponding to that of the exciting winding in the brake device 11, so that the functioning of the thermal relay 23 corresponds to temperature conditions in the magnetic track brake device.

The controller mechanism 26 preferably comprises a drum 106 having disposed thereon and insulated therefrom separate contact segments 107, 108, 109 and 110. These contact segments are arranged to engage respective contact fingers 111 to 123, as is diagrammatically indicated in Fig. 1.

The drum 106 is rigidly disposed on a shaft 125, the rotation of which determines engagement between the contact segments and contact fingers above referred to. The shaft 125 also carries a cam 126, which is adapted to engage one end of a lever 127, which is pivotally mounted intermediate its ends at 128, and connected at its other end through rod 129 to the lever 130 on the aforedescribed brake valve device 14. The cam 126 is designed to progressively actuate lever 130 to the left as shaft 125 is rotated in a counterclockwise direction.

Rotation of the shaft 125 is governed by the master control mechanism 28. This mechanism is embodied in a casing having a chamber 132 to which fluid under pressure may be supplied upon unseating of a supply valve 133, which valve is normally urged toward unseated position by spring 134. Operatively mounted in the casing is a movable abutment 135, which contains interiorly thereof a release valve 136, urged toward an unseated position by a spring 137. When the release valve 136 is unseated a communication is established between the chamber 132 and the atmosphere, by way of passages 138, chamber 139, and exhaust port 140.

The movable abutment 135 has a stem 141 slidable in the casing of the mechanism and connected by a link 142 to one end of a lever 143. The lever 143 is pivotally mounted at 144 to a supporting structure 145, and has its upper end connected to a cable 146 which extends over a pulley 147 and also over a second pulley 148 secured to the shaft 125. The cable 146 is connected at its other end to a spring 149 attached to a bracket 150. The spring 149 is normally under sufficient tension to rotate the shaft 125 to its extreme clockwise position, as viewed in Fig. 1.

When the supply valve 133 is unseated, fluid under pressure may flow from the main reservoir 20, through the main reservoir pipe 37, and passage 152, to chamber 132.

For seating the release valve 136 and unseating the supply valve 133, there is provided a mechanism comprising spaced levers 153 pivotally carried intermediate their ends at 154 by a plunger 155 slidably disposed in a bore 156. The levers 153 are connected at their upper ends to a stem 157 which projects into a slot in the supply valve 133. At their lower ends the levers 153 carry a roller 158 which engages the stem of the release valve 136.

When the plunger 155 is actuated to the right, the levers 153 fulcrum about their upper ends to seat the release valve 136 against opposition of the spring 137, and then fulcrum about their lower ends to unseat the supply valve 133 against opposition of its spring 134. It is to be here understood that the release spring 137 is lighter than the supply spring 134, to thereby permit the operation just described. When the supply valve 133 is unseated, and fluid under pressure is supplied to the chamber 132, the pressure of this fluid acts upon the movable abutment 135 to urge it to the right. As the movable abutment moves to the right it rotates the lever 143 in a counterclockwise direction, thus pulling cable 146 with it. This causes rotation of the shaft 125 in a counterclockwise direction, against opposition of spring 149.

As the movable abutment 135 moves to the right the spaced levers 153 fulcrum about their pivot 154 and move in a counterclockwise direction under action of the supply valve spring 134, until the supply valve 133 is seated. When supply valve 133 seats, the supply of fluid under pressure to chamber 132 will be lapped, and the rotation of shaft 125 will cease. The parts are so designed that valve 133 seats when the pressure in chamber 132 corresponds to the degree of movement of plunger 155. It will thus be apparent that the rotation of shaft 125 is governed by the degree of movement of the plunger 155 to the right.

For actuating the plunger 155 to the right there is provided a cam 160 secured to a shaft 161 which, through suitable fittings 162, is rotatable by a handle 164. The parts are so designed that the plunger 155 is actuated to the right a degree corresponding to the degree of movement of the handle 164 in an application zone, as depicted in Fig. 2. Thus it follows that the degree of rotation of shaft 125 corresponds to the degree of movement of the handle 164 in the application zone.

As shown in Fig. 2, the handle 164 has a "release" position, a "handle-off" position, and is movable into an "application" zone. The handle is so designed that when in the release or any application position it cannot be removed, but when moved to the "handle-off" position a lug 165 comes adjacent a slot 166 to permit removing of the handle. As will more clearly appear later, the handle 164 is used to also actuate the backing up valve device 18.

The control mechanism 28 also includes a rotary valve 168 which, in the position shown in Fig. 1, establishes a communication from the pipe 79 through passage 169, cavity 170, and passage 171, with pipe 172 leading to the aforementioned chamber 73 in the double check valve device 16.

The rotary valve 168 is movable to a position where this communication is closed and the pipe 172 connected to the main reservoir pipe 37, through cavity 170 and passage 173, which passage contains a spring loaded check valve 174 adapted to permit flow only from the main reservoir to the pipe 172 and to prevent flow in the opposite direction.

The movement of the rotary valve 168 to establish the second communication referred to is accomplished when the handle 164 is moved to the "handle-off" position. When the handle 164 is thus moved, a cam 175 secured to the shaft 161 moves with the shaft to turn the finger 176, attached to the rotary valve 168, from the full line position shown in Fig. 1 to that indicated to the right thereof, for establishing the second mentioned communication. The function of the cam 175 in shifting the finger 176 is more clearly shown in Figs. 3 and 4.

The operation of this embodiment of my invention is as follows:

Running condition

When the vehicle is to be operated under power, the brake controller handle 164 is maintained in release position, in which case the parts of the equipment will be in the positions shown in Fig. 1. It will be noted that the contact segment 107 connects the two contact fingers 111 and 112, so that power may be supplied to the driving motors by operation of the motor controller 24. This power is supplied from a trolley 167 through a circuit which includes conductor 177, contacts 107, 111 and 112, conductor 178, motor controller 24, conductor 179, the driving motors, and ground connection 180. The motors are thus operated to propel the vehicle.

It will be noted from Fig. 1 that the backing up valve device 18 establishes a communication between the main reservoir pipe 37 and pipe 86 leading to the double check valve device 16, thus causing the valve 68 therein to be seated and the valve 69 to be unseated. The one handle 164 is employed to operate the master control mechanism 28 as well as the backing up valve device 18. When the handle 164 is removed from the backing up valve device 18 it must be rotated to the "service, handle-off" position, as indicated in Fig. 8, in which position the communication is established as shown in Fig. 1. The purpose of this will appear more fully later.

Normal application

When it is desired to effect a normal application of the brakes, the brake controller handle 164 is moved into the application zone to a degree according to the desired degree of braking. As the handle 164 is thus moved, the release valve 136 is seated and the supply valve 133 is unseated, so that fluid under pressure is supplied to the chamber 132. As before described, this causes the movable abutment 135 to be actuated to the right to effect rotation of shaft 125 to the same degree as manual movement of the handle 164. Assuming now that shaft 125 is rotated to a position corresponding to the degree of movement of handle 164, it will be observed from Fig. 1 and Fig. 6 that the brake valve device 14 will be first actuated to supply fluid under pressure to the brake cylinder 10, and that the controller mechanism 26 will be then correspondingly operated to effect first an application of the dynamic brakes and then of both the dynamic and magnetic track brakes.

As the controller mechanism 26 is operated to application position, the contact segment 107 disengages from the contact fingers 111 and 112 to isolate the driving motors from the trolley 167. At the same time, the contact segment 108 engages the two contact fingers 113 and 114 to connect the driving motors in a dynamic braking circuit, which circuit includes conductor 181, the contact fingers 113 and 114 (or one or both of contact fingers 115 and 116, depending upon the degree of rotation of the drum 106) conductor 182, resistance 31, and conductor 183. It will be apparent from the arrangement shown that connecting contact fingers 115 and 116 serve to cut out portions of a resistance 184, and that the lower the resistance in the dynamic braking circuit the greater will be the degree of dynamic braking.

As current flows in the dynamic braking circuit the voltage drop across the resistance 31 will energize relay 30 and cause it to close its contacts 186. Closing of these contacts establishes a circuit from a battery 187 to the suppression magnet valve device 33 in the brake valve device 14. This circuit includes, beginning at battery 187, conductor 188, contacts 186, conductor 189, the magnet valve device 33 and ground connection 190. This effects energization of the magnet valve device 33 and causes it to seat its double beat valve 63. Seating of this double beat valve closes communication between the main reservoir and the chamber 35, so that fluid under pressure cannot be supplied to the brake cylinder due to operation of the self-lapping portion 32 of the brake valve device 14.

At the same time, if the controller mechanism 26 has been rotated far enough so that contact segment 109 has engaged contact fingers 117 and 118 the lowering magnet valve device 22 will be energized, through a circuit which includes beginning at the battery 187, contacts 191 of relay 25, conductor 192, contacts 109, 117 and 118, conductor 193, the magnet valve device 22, and ground connection 194. The magnet valve device 22 will thus be energized to seat its double beat valve 93. Seating of this double beat valve cuts off the supply of fluid under pressure from the main reservoir 20 to the chamber 90 in the raising cylinder 21, and vents this cylinder to the atmosphere by way of exhaust port 97. The track brake device 11 will then fall to engagement with the rail due to gravity.

At the same time contact finger 109 engages contact fingers 117 and 118 it also engages contact finger 119 to connect the track brake device 11 to the battery 187 through contact finger 119, resistance 195, conductor 196, the resistance 194, conductor 197, the brake device 11, and ground connection 198. The brake device 11 will thus be energized and produce a braking effect on the rail.

It is to be here understood that while the track brake device 11 has been shown as suspended above a track rail by fluid pressure means, it may be also suspended on springs and be attracted to engagement with the rail upon energization thereof, or held suspended above the rail by electrical means which is deenergized or energized upon rotation of the controller mechanism 26, all of these means being commonly known and employed in the art.

It will thus be seen that upon effecting a normal application of the brakes the magnetic track brakes and dynamic brakes are applied while the fluid pressure brakes are held suppressed so long as the dynamic brakes are effective.

When the speed of the vehicle diminishes the effectiveness of the dynamic brakes will decrease at or near the end of the stop. When this effectiveness has decreased below a predetermined value, the relay 30 will be deenergized and thus open its contacts 186. Opening of these contacts deenergizes the suppression magnet valve device 33, so that the fluid pressure brakes are then applied to insure that the vehicle be stopped and held at rest.

The magnetic track brakes will be effective throughout the entire stop, but if these brakes are maintained energized after the vehicle comes to a stop they may be damaged due to overheating. At the time the magnetic track brakes were applied contact segment 119 connected contact fingers 122 and 123. Connecting these fingers partially establishes a circuit to the relay 25, which circuit includes beginning at battery 187, conductor 188, now opened contacts 100 of thermal relay 23, conductor 200, relay 25, conductor 201, contacts 110, 122 and 123, and ground connection 202. Since relay contacts 100 are opened, the relay 25 will not be energized.

When, however, the temperature of the heating coil 103 reaches a predetermined value, which will usually not be attained until after the vehicle has come to rest, the thermal relay will close its contacts 100 so that relay 25 will be energized, thus opening contacts 191 and closing contacts 203. Closing of contacts 203 forms a holding circuit for the relay so that it will remain energized until the controller mechanism 26 has been actuated back to the position where the track brakes are normally released.

Opening of the contacts 191 interrupts the circuit to both the magnet valve device 22 and the track brake device 11, so that the magnetic track brake will be entirely released. It will thus be seen that the thermal relay 23 functions to release the magnetic track brakes at a predetermined temperature of the heating coil 103.

When it is desired to effect a full release of the brakes, the brake controller handle 164 is returned to release position. In this position the supply valve 133 will be seated and the release valve 136 unseated, so that fluid under pressure is released from the chamber 132. Spring 149 will then return shaft 125 to its release position, in which position the vehicle motors will be disconnected from the dynamic braking circuit, while the track brakes will likewise be disconnected from the battery 187. In case the relay 25 has in the meanwhile been energized by operation of the thermal relay 23, the return of the controller mechanism 26 to release position interrupts the circuit through fingers 122 and 123 to the relay 25, and the relay thus drops to its lowermost position.

*Derail throwing application*

When the vehicle approaches a derail and it is desired to close the derail so that the vehicle may pass, the operator turns the handle 77 of the derail throwing brake valve device 17 to application position, as indicated in Fig. 7, while permitting the handle 164 to remain in release position. Fluid under pressure is then supplied from the main reservoir to pipe 79 from which it flows through passage 169, cavity 170, passage 171, pipe 172, past the unseated valve 69 in the double check valve device 16, pipe 67, past slide valve 66 in double check valve device 15, which moves to the right, and through pipe 62 to the brake cylinder 10. The fluid pressure brakes only will then be applied.

The purpose of providing the derail throwing brake valve device 17 is to permit an application of the fluid pressure brakes so as to hold the vehicle at rest while the operator moves the motor controller 24 to power supply position, to cause current to pass through an electromagnet in the derail throwing switch to close the derail. This could not be accomplished by movement of the main brake controller handle 164, as the motors would then be disconnected from the trolley and current could not be caused to flow through the electromagnet in the derail throwing switch.

After the derail throwing switch has been closed the handle 74 is returned to release position to release the fluid pressure brakes. The vehicle may then proceed on past the derail switch.

*Backing-up application*

When it is desired to back the vehicle up, the operator turns the main brake controller handle 164 to "handle-off" position, in which position the handle can be removed and then taken to the rear of the car to operate the backing up valve device 18.

When the handle 164 is thrown to the "handle-off" position on the main brake controller 28, the rotary valve 168 is moved to the position where communication between the passages 169 and 171 is interrupted and a communication formed between passages 171 and 173, to apply the fluid pressure brakes. Thus when the handle 164 is taken to the rear of the car and attached to the backing up brake valve device 18 the brakes are applied, and the backing up valve device 18 must be then operated to establish the communication as shown in Fig. 9 in order to release this application.

Thereafter, applications may be made by operating the brake valve device to the application position shown in Fig. 1. To lap the brake application the brake valve device is operated to the position shown in Fig. 10. When it is desired to again operate the vehicle from the front end the handle 164, now on the backing up valve device 18, is turned to the "service, handle-off" position, as shown in Fig. 8, in which position it may be removed and then taken to the front end of the car.

While I have described my invention with particular reference to one embodiment thereof, it is to be understood that it is not my intention to be limited to the specific arrangement shown for this embodiment, or otherwise than by the spirit and scope of the appended claims.

Having now described my invention, what I claim as new and desire to secure by Letters Patent, is:

1. In a vehicle brake system, in combination, electric braking means, fluid pressure braking means, common control means including a control valve device and an electric brake controller mechanically interconnected and operable to various application positions to effect and control applications of said two braking means, fluid pressure operated means for operating said common control means, a control element movable to different positions, and means for effecting a supply of fluid under pressure to said fluid pressure operated means according to the degree or extent of movement of said control element.

2. In a vehicle brake system, in combination, electric brake means, fluid pressure brake means, common control means including a control valve device and an electric brake controller mechanically interconnected and operable to various application positions to effect and control applications of said two brake means, a control handle movable to different positions, and fluid pressure means for actuating said common control means to an application position corresponding to the position of said control handle.

3. In a vehicle brake system, in combination, a plurality of brake systems, common control means for controlling applications of said plurality of brake systems, a mechanism having a chamber and a supply valve operable when open to effect a supply of fluid under pressure to said chamber, manually operated means for effecting opening of said supply valve, and a movable abutment subject to the pressure of fluid in said chamber and operated by said pressure to operate said control mechanism and to control closing of said supply valve.

4. In a vehicle brake system, in combination, a plurality of brake systems, common control means for controlling applications of said plurality of brake systems, a control mechanism comprising a casing having a chamber and a supply valve operable when open to effect a supply of fluid under pressure to said chamber, a movable abutment subject to the pressure in said chamber and movable according to the degree of pressure established in said chamber, means connecting said abutment to said common control means and actuating said common control means as said abutment moves under influence of the pressure in said chamber, and means for closing said supply valve upon a predetermined movement of said abutment.

5. In a vehicle brake system, in combination, fluid pressure brake means, electric brake means, common control means including a control valve device and an electric brake controller mechanically interconnected and for controlling applications of said two brake means, a casing having a chamber, a valve operable manually to effect a supply of fluid under pressure to said chamber, a movable abutment subject to the pressure of fluid supplied to said chamber and operable at a preselected pressure to effect closing of said valve, and means operable in accordance with operation of said abutment for actuating said common control means.

6. In a vehicle brake system, in combination, a brake cylinder, a magnetic track brake device, veehicle driving motors adapted to be operated as dynamic brakes, common control means operable to effect a supply of fluid under pressure to said brake cylinder, to also effect a supply of current to said track brake device, and to also connect said motors in a dynamic braking circuit, a casing defining a chamber, a supply valve operable to effect a supply of fluid under pressure to said chamber, a control handle, means for opening said supply valve according to the degree of movement of said handle, a movable abutment movable according to the pressure of fluid supplied to said chamber for effecting seating of said supply valve when the pressure in said chamber corresponds to the degree of movement of said handle, and means governed by the movement of said abutment for correspondingly actuating said common control means.

7. In a vehicle brake system, in combination, magnetic track brake means, control means operable to an application position to effect an application of said track brake means, thermal means operable at a predetermined temperature to effect a release of said track brake means, and means for causing said predetermined temperature to correspond to temperature conditions in the braking portion of said track brake means.

8. In a vehicle brake system, in combination, magnetic track brake means, means for effecting an application of said track brake means, a thermal relay operable at a preselected temperature to actuate a set of contacts, means responsive to actuation of said contacts for effecting a release of said track brake means, and means for causing said preselected temperature to correspond to the temperature conditions within energizing portions of said track brake means.

9. In a vehicle brake system, in combination, magnetic track brake means having an energizing winding, means for establishing a circuit through which current is supplied to said winding to effect energization thereof to produce a braking effect, means for producing a heating effect simulating the heating conditions within said winding when energized, and thermal means responsive to said heating effect for controlling the duration of energization of said winding.

10. In a vehicle brake system, in combination, magnetic track brake means, means for establishing a circuit through which current is supplied to effect energization of said magnetic track brake means, means connected to said circuit for producing a heating effect corresponding to the heating effect within said brake means, and thermal means responsive to a predetermined temperature of the heating effect produced by said last mentioned means for effecting deenergization of said track brake means.

11. In a vehicle brake system, in combination, magnetic track brake means, means for establishing a circuit through which current is supplied to energize said magnetic track brake means, means responsive to the current in said circuit for producing a heating effect corresponding to the heating effect within said brake means, and means responsive to a predetermined temperature of said heating effect for effecting opening of said circuit.

12. In a vehicle brake system, in combination, magnetic track brake means, means for establishing a circuit through which current is supplied to energize said magnetic track brake means, means connected to said circuit for producing a heating effect, normally open contacts, means responsive to closing of said contacts for effecting opening of said circuit, and means operated at a predetermined temperature of said heating effect for closing said contacts.

13. In a vehicle brake system, in combination, magnetic track brake means, a controller device operable to application position to establish a circuit through which current is supplied to energize said track brake means, a heating coil to which current is supplied when said controller device is operated to supply current to said track brake means, a thermal relay operated at a predetermined temperature of said heating coil, and means responsive to operation of said thermal relay for effecting deenergization of said track brake means.

14. In a vehicle brake system, in combination, a magnetic track brake device, a controller device operable to application position to effect energization of said track brake device, a heating coil adapted to have current supplied thereto when said track brake device is energized, the temperature rise of said heating coil corresponding substantially to the temperature rise of said track brake device when current is supplied to both, a thermal relay responsive to the temperature of said heating coil and adapted to actuate contacts at a predetermined temperature of said coil, and means responsive to actuation of said contacts for effecting deenergization of both said heating coil and said magnetic track brake device.

15. In a vehicle brake system, in combination, a magnetic track brake device, a circuit adapted to be established at will to supply current to said magnetic track brake device, a resistance in said circuit, a heating coil connected across said resistance, a thermal relay having contacts adapted to be actuated at a predetermined temperature of said heating coil, and means responsive to actuation of said contacts for effecting opening of said circuit.

16. In a vehicle brake system, in combination, a magnetic track brake device, means for establishing at will a circuit through which current is supplied to energize said track brake device, a heating coil connected to said circuit and adapted to have temperatures produced therein corresponding to those produced in said track brake device, normally open contacts, thermal means for closing said contacts at a predetermined temperature of said heating coil, and means responsive to closing of said contacts for effecting opening of said circuit.

17. In a vehicle brake system, in combination, fluid pressure brake means, an electric brake means, common control means operable to condition each of said brake means for application, manually operated brake control means operable in a release position to establish a communication through which fluid under pressure may be supplied to effect an application of said fluid pressure brake means only, and operable to an application position to actuate said common control means, and independent manually operated means for effecting a supply of fluid under pressure through said communication when said first mentioned manually operated means is in release position.

18. In a vehicle brake system, in combination, a plurality of brake systems, common control means for controlling applications of said plurality of brake systems, manually operated means operable in release position to establish a communication through which fluid under pressure may be supplied to effect an application of one of said brake systems, and operable to application position to close said communication and to actuate said common control means, and independent means for effecting a supply of fluid under pressure to said communication when said manually operated means is in release position.

19. In a vehicle brake system, in combination, brake means, a manually operated control means for the head end of the vehicle for controlling applications of said brake means, said manually operated control means establishing in its release position a communication through which fluid under pressure may be supplied to effect an application of said brake means independently of operation of said manually operated means, and being operable to a handle-off, a release and an application position, a valve device for the rear end of the vehicle for also effecting an application of said brake means, and a common control handle for actuating said manually operated means and said valve device, said common handle being removable from said manually operated means only in the handle-off position, said manually operated means closing said communication when operated to said handle-off position.

20. In a vehicle brake system, in combination, magnetic track brake means, dynamic brake means, means operable to effect an application of both of said brake means, and operable to effect a release of both of said brake means, and thermal means for independently effecting a release of said magnetic track brake means before said last mentioned means has been operated to effect the release of both of said brake means.

21. In a vehicle brake system, in combination, magnetic track brake means, dynamic brake means, a controller mechanism operable to an application position to simultaneously effect an application of both of said brake means, and thermal means rendered operative only when said controller mechanism is in application position for controlling the duration of application of said magnetic track brake means.

22. In a vehicle brake system, in combination, magnetic track brake means, dynamic brake means, a controller device operable to application position to effect an application of both of said brake means, a circuit adapted to be closed to effect a release of said magnetic track brake means, normally opened contacts in said circuit, thermal means for closing said contacts, and means for preventing complete closure of said circuit until said controller device has been operated to a predetermined application position.

23. In a magnetic track brake system having coil energized brakes, temperature responsive means for preventing the generation of excessive heat in the brake coils by interrupting the coil energizing circuit.

24. In a magnetic track brake system including a brake shoe having a coil and an energizing circuit therefor, a shunt in said circuit, a relay adapted to be operated thereby, and a power switch operated by said relay, said relay being adapted, upon flow of current of predetermined value, to cause said power switch to open after a predetermined interval, whereby to arrest the energization of said brake shoe coil and prevent overheating thereof.

25. In a magnetic track brake system including a brake shoe having a coil and an energizing circuit therefor and means in said circuit adapted to limit the time of energization of the brake coil whereby to prevent overheating of said coil, said means comprising a shunt, a relay adapted to be energized by said shunt and upon energization, to operate, after a lapse of time, to cause a power switch to open, said power switch, upon energization, being adapted to interrupt said energizing circuit and prevent overheating of said brake shoe coil.

26. In a mechanism for arresting the energization of a magnetic track brake coil by interrupting the energizing circuit thereof, a shunt connected in said energizing circuit, a relay adapted to be energized by said shunt, and means adapted to be made operable upon energization of said relay to interrupt the energizing circuit of the track brake coil.

27. In a magnetic track brake system including a brake shoe having a coil and an energizing circuit therefor, a power switch adapted when energized to interrupt said energizing circuit, and means for energizing said power switch including a shunt adapted upon the flow therethrough of current of predetermined value to cause energization of said power switch to open said brake shoe energizing circuit after a predetermined interval.

28. In a magnetic track brake system including a brake shoe having a core, a coil, and an energizing circuit therefor; switch means in said circuit, solenoid means for operating said switch means to open and close said circuit, and means operative substantially in accordance with the temperature of said coil adapted to cause said solenoid means to open said switch means when a predetermined temperature of the coil is reached.

29. In a magnetic track brake system including a brake shoe having a core, a coil, and an energizing circuit therefor; switch means in said circuit, solenoid means for operating said switch means to open and close said circuit, relay means for operating said solenoid means, and means operative substantially in accordance with the temperature of said brake shoe coil adapted, when a predetermined temperature is reached, to cause said relay means to operate said solenoid means to open said switch means and arrest the energization of the coil whereby to prevent the production of excessive temperature in said coil.

30. In a magnetic track brake system including a brake shoe having a core, a coil, and an energizing circuit therefor; switch means in said brake coil energizing circuit, an energizing circuit for said switch means, and temperature responsive switch means associated with said brake shoe connected in said switch energizing circuit and operative substantially in accordance with the temperature in said brake shoe coil, said temperature responsive switch means being adapted, when said temperature exceeds a predetermined value, to cause said switch means to open said energizing circuit.

31. In a magnetic track brake system including a brake shoe having a core, a coil, and an energizing circuit therefor; normally closed switch means in said circuit, solenoid means for opening said switch, and means operative substantially in accordance with the temperature in said brake shoe coil for energizing said solenoid means to cause said switch means to be opened thereby.

32. In a magnetic track brake system including a brake shoe having a core, a coil, and an energizing circuit therefor; normally open temperature responsive circuit switch means associated with said brake shoe adapted to close substantially when the temperature in said coil exceeds a predetermined amount, a circuit operatively connected to said temperature responsive circuit switch means and having therein a solenoid coil, and means including a relay switch responsive to the energization of said solenoid coil for causing interruption of the brake coil energizing circuit when said solenoid coil is energized by closing of said temperature responsive circuit switch means.

33. In a vehicle brake system, in combination, magnetic track brake means, control means operable to an application position to effect an application of the track brake means, and thermal means operable at a predetermined temperature to effect a release of said track brake means.

34. In a magnetic track brake system having coil energized brakes, temperature responsive means for interrupting the coil energizing circuit at a predetermined temperature.

ELLIS E. HEWITT.